US 6,560,846 B1

(12) United States Patent
Shioya et al.

(10) Patent No.: US 6,560,846 B1
(45) Date of Patent: *May 13, 2003

(54) METHOD AND APPARATUS FOR EFFECTING INTERFERENCE FIT OF TWO PARTS BY ACCELERATING ONE OF THE PARTS

(75) Inventors: Shigemi Shioya, Okazaki (JP); Wataru Fuwa, Okazaki (JP)

(73) Assignee: Toyota Jidosha Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,157

(22) Filed: Dec. 8, 1997

(30) Foreign Application Priority Data

Dec. 20, 1996 (JP) .............................. 8-340288

(51) Int. Cl.[7] .............................. B23P 19/02
(52) U.S. Cl. .................. 29/525; 29/235; 29/432.2; 29/451; 29/900; 29/714; 82/118; 82/147; 82/148
(58) Field of Search .................. 29/525, 714, 451, 29/700, 235, 432.2, 718; 228/112.2, 113; 82/118, 147, 148

(56) References Cited

U.S. PATENT DOCUMENTS

| 2,895,215 A | 7/1959 | Neher et al. ................... 29/235 |
| 3,334,510 A | 8/1967 | Hallesy ......................... 72/407 |
| 3,842,483 A | 10/1974 | Cramer ......................... 29/450 |
| 4,886,392 A | 12/1989 | Iio ............................ 29/525 X |
| 5,348,210 A | 9/1994 | Linzell ....................... 29/525 X |
| 5,474,226 A | 12/1995 | Joseph ....................... 228/112.1 |
| 5,875,953 A | 3/1999 | Shioya ....................... 228/112.1 |

FOREIGN PATENT DOCUMENTS

| BE | 863936 | 5/1978 |
| EP | 0 270 324 | 6/1988 |
| FR | 1111102 | 2/1956 |
| JP | 63-144136 | 9/1988 |
| JP | 63-295129 | 12/1988 |
| JP | 4-146031 | 5/1992 |
| RU | 1171265 A | 8/1985 |
| SU | 1171265 A | 8/1985 |

OTHER PUBLICATIONS

Patent Abstracts of Japan, vol., 12, No. 208, Jun. 15, 1988 (1 page).
Patent Abstracts of Japan, vol. 14, No. 335, Jul. 19, 1990 (1 page).
European Search Report dated Oct. 15, 1996 (3 pages).
Communication dated Oct. 29, 1996 (1 page).
Concise Explanation Under Rule 98 (1 page).

*Primary Examiner*—P. W. Echols
*Assistant Examiner*—John Hong
(74) *Attorney, Agent, or Firm*—Finnegan, Henderson, Farabow, Garrett & Dunner, L.L.P.

(57) ABSTRACT

Method and apparatus for effecting an interference fit of a first part and a second part, wherein a thrust force is applied to the second part in a direction toward the first part to thereby accelerate the second part for applying a kinetic energy to the second part to cause abutting contact of the second part with the first part for achieving the interference fit of the first and second parts, and wherein the initiation of acceleration of the second part by the thrust force is inhibited until the thrust force has been increased to a predetermined threshold, and is permitted when the thrust force has been increased to the predetermined threshold.

15 Claims, 12 Drawing Sheets

METHOD AND APPARATUS FOR EFFECTING INTERFERENCE FIT OF TWO PARTS BY ACCELERATING ONE OF THE PARTS

CROSS REFERENCE TO RELATED APPLICATION

U.S. patent application Ser. No. 08/670,743 filed Jun. 21, 1996, now U.S. Pat. No. 5,875,953.

This application is based on Japanese Patent Application No. 8-340288 filed Dec. 20, 1996, the content of which is incorporated hereinto by reference.

BACKGROUND OF THE INVENTION

1. Field of the Invention

The present invention relates to techniques for effecting an interference fit of two parts.

2. Discussion of the Related Art

One example of known techniques for effecting an interference fit of two parts is disclosed in JP-U-63-144136 (Japanese Utility Model Application as published on Sep. 22, 1988), wherein a first part 200 is held stationary, and a second part 202 is forced by a rigid pressure head 204, into engagement with the first part 200, as shown in FIG. 12, to thereby achieve an interference fit of the first and second parts 200, 202.

In the known technique shown in FIG. 12, a mechanical force F is applied to the second part 202 by abutting contact of the pressure head 204 with one of the opposite ends of the second part 202 which is remote from the first part 200. According to this arrangement, the compressive stress acting on the second part 202 in its axial direction as a result of the abutting contact of the second part 202 with the first part 200 is substantially evenly distributed over the entire length of the second part 202, as indicated in the graph given in the lower part of FIG. 12. Thus, this conventional technique suffers from a problem that the axial portion of the second part 202 other than its end portion which engages the first part 200 for the interference fit is subject to the axial compressive stress.

In an effort to solve the above problem, the assignee of the present application developed a technique wherein at least one of the two parts is accelerated toward the other or each other in a direction that permits the interference fit of the two parts, to apply a kinetic energy to the above-indicated at least one part, for thereby achieving the interference fit of the two parts, as disclosed in co-pending Application, Ser. No. 08/670,743 filed Jun. 21, 1996. According to this technique, the axial compressive stress acting on the second part 202 as a result of the abutting contact with the first part 200 continuously decreases in the axial direction from the axial end of the second part 202 abutting on the first part 200 toward the other axial end of the second part 202, at which the stress is zero, as indicated in FIG. 13.

The present applicants had the following finding as a result of continued research of the technique as disclosed in the above-identified co-pending application. That is, it was found that the thrust force applied to the second part immediately after the initiation of the acceleration of the second part tends to vary or fluctuate unless the thrust force to be applied upon the initiation of the acceleration is positively controlled. The variation of the initial thrust force applied to the second part causes a variation in the velocity of the second part upon abutting contact of the second part with the first part, leading to deteriorated stability in the accuracy of the interference fit of the two parts.

SUMMARY OF THE INVENTION

It is therefore a first object of the present invention to provide a method of effecting an interference fit of a first and a second part by accelerating the second part into abutting contact with the first part, which method permits improved stability of the thrust force to be applied to the second part upon initiation of acceleration of the second part.

This first object may be achieved according to a first aspect of the present invention, which provides a method of effecting an interference fit of a first part and a second part, comprising: a thrust force applying step of applying a thrust force to the second part in a direction toward the first part to thereby accelerate the second part for applying a kinetic energy to the second part to cause abutting contact of the second part with the first part for achieving the interference fit of the first and second parts; and an acceleration initiation inhibiting and permitting step of inhibiting initiation of acceleration of the second part by the thrust force until the thrust force has been increased to a predetermined threshold, and permitting the initiation of the acceleration when the thrust force has been increased to the predetermined threshold.

In the present method of effecting the interference fit of the two parts, the initiation of the acceleration of the second part is positively inhibited until the thrust force applied to the second part has been increased to the predetermined threshold or lower limit, so that the actual thrust force applied to the second part upon initiation of the acceleration is stabilized at a sufficient value, whereby the velocity of movement of the second part immediately before the abutting contact of the second part with the first part is accordingly stabilized to assure improved stability in the accuracy of the interference fit of the first and second parts.

The first and second parts may both have mutually fitting portions that are rigid. Alternatively, one and the other of these mutually fitting portions of the two parts may be rigid and elastic, respectively.

Where one of the two parts has an end portion in the form of a rod or shaft while the other part has a hole in which the end portion of the above-indicated one part is fitted with an interference, the above-indicated one part having the rod-shaped end portion or the other part having the hole may be accelerated. In other words, the above-indicated second part may be a part having a rod-shaped end portion or a hole. The second part may be accelerated by direct application of a force based on a pressure of a gas or liquid, or by indirect application of a force such as a magnetic force, a gravitational force or a centrifugal force. In one form of the method wherein the acceleration of the second part is effected by a pressurized gas, the pressurized gas delivered from a high-pressure source is introduced through a suitable gas passage into a rear space formed at the rear of the second part which is accommodated in a guide passage such that the second part may be guided toward the first part. The above-indicated rear space is defined by at least the rear end face of the second part remote from the first part and a rear end portion of the guide passage remote from the first part. It is desirable to terminate the acceleration of the second part to permit a constant-velocity or uniform motion of the second part immediately before the abutting contact of the second part with the first part, in order to assure that the axial compressive stress at the rear end of the second part remote from the first part is substantially zero upon abutting contact of the second part with the first part.

In one preferred form of the method of the invention, the acceleration initiation inhibiting and permitting step comprises inhibiting the initiation of the acceleration of the second part by engagement of a stop member with the second part.

In another preferred form of the present method, the acceleration initiation inhibiting and permitting step comprises inhibiting the initiation of the acceleration of the second part by clamping the second part.

In a further preferred form of the present method, the acceleration initiation inhibiting and permitting step comprises inhibiting the initiation of the acceleration of the second part by forcing the second part onto a stationary member to thereby generate a force of friction between the second part and the stationary member.

A second object of the present invention is to provide an apparatus for effecting an interference fit of a first and a second part by accelerating the second part into abutting contact with the first part, which apparatus permits improved stability of the thrust force to be applied to the second part upon initiation of acceleration of the second part.

The above second object may be achieved according to a second aspect of the invention, which provides an apparatus for effecting an interference fit of a first part and a second part, comprising: a thrust force applying device for applying a thrust force to the second part in a direction toward the first part to thereby accelerate the second part for applying a kinetic energy to the second part to cause abutting contact of the second part with the first part for achieving the interference fit of the first and second parts; and an acceleration initiation inhibiting and permitting device for inhibiting initiation of acceleration of the second part by the thrust force until the thrust force has been increased to a predetermined threshold, and permitting the initiation of the acceleration when the thrust force has been increased to the predetermined threshold.

In the present apparatus for effecting the interference fit, the initiation of the acceleration of the second part is positively inhibited by the acceleration initiation inhibiting and permitting device until the thrust force applied to the second part has been increased to the predetermined threshold or lower limit, so that the actual thrust force applied to the second part upon initiation of the acceleration is stabilized, whereby the velocity of movement of the second part immediately before the abutting contact of the second part with the first part is accordingly stabilized to assure improved stability in the accuracy of the interference fit of the first and second parts.

In one preferred form of the apparatus of the present invention, the acceleration initiation inhibiting and permitting device comprises a movable member movable to an inhibiting position in which the movable member engages the second part to inhibit the initiation of the acceleration of the second part, and a permitting position in which the movable member is spaced apart from the second part to permit the initiation of the acceleration of the second part.

In one advantageous arrangement of the above preferred form of the apparatus, the movable member includes a stop member movable to a stop position as the inhibiting position in which the stop member engages a surface of the second part which faces the first part, to thereby inhibit the initiation of the acceleration of the second part, and a non-stop position as the permitting position in which the stop member is spaced apart from the surface of the second part, to thereby permit the initiation of the initiation of the second part, and the acceleration initiation inhibiting and permitting device further comprises an actuator for moving the stop member to the stop position and the non-stop position.

In another advantageous arrangement of the above form of the apparatus, the movable member comprises a clamping member operable to a clamp position in which the clamping member is held in pressing contact with a surface of the second part for holding the second part in a direction intersecting the surface, and an unclamp position in which the clamping member is spaced apart from the surface, and the acceleration initiation inhibiting and permitting device further comprises an actuator for operating the clamping member to the clamp and unclamp positions. The clamping member may be a collet of a collet chuck, for example.

In a further advantageous arrangement of the above form of the apparatus the apparatus further comprises a stationary housing having a guide passage for slidably guiding the second part, and the movable member comprises a presser member movable to an advanced position in which the presser member forces the second part at a surface thereof facing an inner surface of the guide passage, onto the inner surface, to thereby inhibit the initiation of the acceleration of the second part, and a retracted position in which the presser member is spaced apart from the surface of the second part, to thereby permit the initiation of the acceleration of the second part. In this case, the acceleration initiation inhibiting and permitting device further comprises an actuator for moving the presser member to the advanced and retracted positions.

A third object of this invention is to provide an apparatus for effecting effecting an interference fit of a first and a second part by accelerating the second part into abutting contact with the first part, which apparatus is capable of controlling in a feedback manner the thrust force to be applied to the second part upon initiation of acceleration of the second part, to thereby improve the stability of the thrust force upon the initiation of the acceleration.

The above object may be achieved according to a third aspect of the present invention, which provides an apparatus for effecting an interference fit of a first part and a second part, comprising: a thrust force applying device for applying a thrust force to the second part in a direction toward the first part to thereby accelerate the second part for applying a kinetic energy to the second part to cause abutting contact of the second part with the first part for achieving the interference fit of the first and second parts; and an acceleration initiation inhibiting and permitting device for inhibiting initiation of acceleration of the second part by the thrust force until the thrust force has been increased to a predetermined threshold, and permitting the initiation of the acceleration when the thrust force has been increased to the predetermined threshold, wherein the acceleration initiation inhibiting and permitting device comprises (a) a movable member movable to an inhibiting position in which the movable member engages the second part to inhibit the initiation of the acceleration of the second part, and a permitting position in which the movable member is spaced apart from the second part to permit the initiation of the acceleration of the second part, and (b) a moving device for moving the movable member to the inhibiting position until the thrust force has been increased to the predetermined threshold, and to the permitting position when the thrust force has been increased to the predetermined threshold.

In the present apparatus, the thrust force actually acting on the second part is fed-back to control the thrust force applied to the second part upon initiation of the acceleration, so that the accuracy of control of the initial thrust force applied to the second part is significantly improved.

The moving device may be an electrically operated actuator for moving the movable member on the basis of an output signal of a sensor, which signal relates to or represents the thrust force applied to the second part. Alternatively, the moving device may be a mechanically operated actuator for moving the movable member on the basis of a force which relates to or represents the thrust force applied to the second part. Thus, the moving member may be either electrically or mechanically associated with the movable member.

In one preferred form of the apparatus according to the third aspect of the invention, the moving device comprises: a sensor generating an output signal indicative of a quantity relating to the thrust force applied to the second part, an actuator for moving the movable member to the inhibiting and permitting positions; and a controller connected to the sensor and the actuator, for controlling the actuator on the basis of the output signal of the sensor, to hold the movable member in the inhibiting position until the thrust force has been increased to the predetermined threshold, and move the movable member to the permitting position when the thrust force has been increased to the predetermined threshold.

In one advantageous arrangement of the above preferred form of the apparatus, the thrust force applying device includes a pressurizing device for raising a pressure acting on the second part in the direction toward the first part, to a level higher than an atmospheric pressure, for thereby applying the thrust force to the second part, and the sensor comprises a pressure sensor whose output signal the indicates the pressure acting on the second part, as the quantity, the controller controlling the actuator on the basis of the output signal of the pressure sensor.

In the above advantageous arrangement, the pressurizing device may comprise: a high-pressure source for delivering a pressurized gas; a structure for defining a guide passage for substantially gas-tightly and slidably guiding the second part toward the first part; and means for defining a gas passage connecting the high-pressure source and one of opposite end portions of the guide passage which is remote from the first part. In this instance, it is preferable to provide a sealing member held in gas-tight contact with an outer surface of the second part and an inner surface of the guide passage, in order to avoid leakage of the pressurized gas through a gap between the outer surface of the second part and the inner surface of the guide passage when the pressurized gas is introduced from the high-pressure source into the end portion of the guide passage remote from the first part.

In another preferred form of the apparatus according to the third aspect of this invention, the thrust force applying device comprises a pressurizing device for raising a pressure acting on the second part in the direction toward the first part, to a level higher than an atmospheric pressure, for thereby applying the thrust force to the second part, and the moving device comprises an actuator which receives as a pilot pressure the pressure acting on the second part and which is operated to hold the movable member in the inhibiting position until the pilot pressure has been raised to a predetermined level and to move the movable member to the permitting position when the pilot pressure has been raised to the predetermined level.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
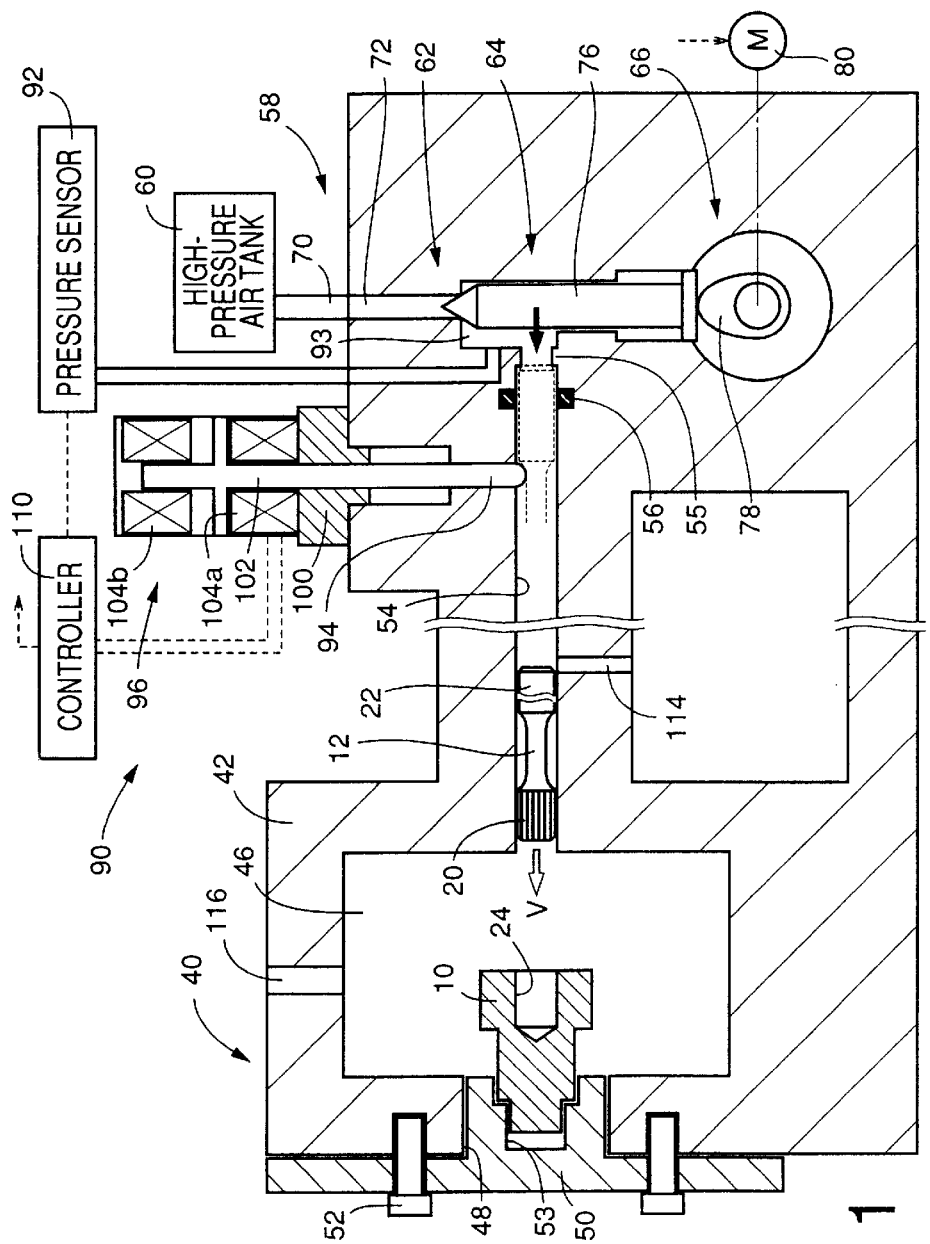
FIG. 1 is a side elevational view in cross section of a press fitting apparatus constructed according to one embodiment of this invention.

Referring first to FIG. 1, there is shown a press fitting apparatus constructed according to one embodiment of this invention as an apparatus suitable for practicing practicing a method of effecting an interference fit of two parts in the form of a first part 10 having a hole 24, and a second part 12 which is press-fitted at one axial end portion thereof into the hole 24 of the first part 10.

In the present embodiment, the first part 10 is a pinion shaft while the second part 12 is a torsion bar, and the pinion shaft and the torsion bar are assembled by the press fitting apparatus of FIG. 1, into an assembly used in a power steering system of an automotive vehicle. The torsion bar 12 is a generally elongate member having two large-diameter portions 20, 22 at opposite axial end portions thereof. These two large-diameter portions 20, 22 have substantially the same diameter. The large-diameter portion 20 is the axial end portion which is to be press-fitted into the hole 24 of the pinion shaft 10 with a predetermined amount of interference. This large-diameter axial end portion 20 has alternate axially extending recesses and protrusions formed in its outer circumferential surface such that the recesses and protrusions are alternately arranged in the circumferential direction of the axial end portion 20. These recesses and protrusions, which may be formed by serration, are provided to facilitate deformation of the axial end portion 20 so as to reduce its diameter in the process of the interference fit of the axial end portion 20 with the hole 24.

The press fitting apparatus includes a holder device 40 for holding the first part 10 so as to maintain the horizontal attitude. The holder device 40 has an air chamber 46 formed in a housing 42 of the press fitting apparatus. As shown in FIG. 1, the first part 10 in the form of the pinion shaft is held in the air chamber 46. The housing 42 also has a through-hole 48 which is open at one end thereof to the air chamber 46 and at the other end in the end face of the housing 42. This through-hole 48 is closed by a cap 40 which is removably attached to the housing 42 by screws 52. The cap 40 has an engaging hole 53 which is open to the air chamber 46. The engaging hole 53 is formed for engagement with one of the opposite end portions of the first part 10 which is remote from the hole 24. Thus, the first part 10 is held in the air chamber 46 such that the hole 24 is open in the end face of the other end portion of the first part 10 so that the hole 24 may receive the large-diameter axial end portion 20.

The housing 42 also has a guide passage 54 formed therein for gas-tightly (pressure-tightly) and slidably guiding the second part 12. The guide passage 54 communicates at one end thereof with the air chamber 46 such that this open end is opposed to the hole 24 of the first part 10. The housing 42 has an annular stop 55 formed at the other end of the guide passage 54, for positioning the second part 12 in the guide passage 54, at its initial axial position indicated by broken line in FIG. 1. The housing 42 has an annular groove in which is accommodated a sealing member 56 which is held in gas-tight contact with the inner surface of the guide passage 54 and the outer circumferential surface of the large-diameter axial end portion (rear end portion) 22 of the second part 12 located at the initial axial position.

The press fitting apparatus further includes a thrust force applying device 58 adapted to apply a thrust force to the second part 12 in its axial direction toward the first part 10. The thrust force applying device 58 is a pressurizing device arranged to raise the pressure at the rear of the second part 12, to a level higher than the atmospheric pressure, as described below in detail.

The thrust force applying device 58 includes a high-pressure air tank 60 as a high-pressure source connected to a gas passage in the form of an air passage 62, a control valve 64 associated with the air passage 62, and a drive device 66 for operating the control valve 64. The high-pressure tank 60 stores pressurized air having a suitable high pressure. The air passage 62 consists of an external portion 70 outside the housing 42, and an internal portion 72 formed within the housing 42. The air passage 62 is provided for applying the pressurized air from the high-pressure tank 60 to the rear end portion of the guide passage 54 adjacent to the annular stop 55 which determines the initial axial position of the second part 12.

The control valve 64 is operated by the drive device 66, to open and close the air passage 62 at an intermediate portion thereof. In the present embodiment, the control valve 64 is a needle valve having a valve body 76 slidably received in the housing 42. The needle valve has a closed position of FIG. 1 for closing the air passage 62 to thereby inhibit a flow of the pressurized air from the high-pressure tank 60 into the guide passage 54, and an open position for opening the air passage 62 to thereby permit the flow of the pressurized air into the guide passage 54. The drive device 66 includes a cam 78 and an electric motor 80 for rotating the cam 78. The movement of the valve body 76 to the closed and open positions is effected by the cam 78, which is held in contact with the rear end face of the valve body 76. With the motor 80 suitably controlled, the control valve 64 is operated selectively to the closed and open positions.

The present press fitting apparatus further includes an acceleration initiation inhibiting and permitting device 90, which comprises a pressure sensor 92, a movable member in the form of a stop member 94, and an actuator 96 for moving the stop member 94 between a stop position and a non-stop position (which will be described).

The pressure sensor 92 is one form of a sensor for detecting a quantity relating to or representing a thrust force to be applied to the second part 12.

The pressure sensor 92 is adapted to detect an air pressure in a rear space 93 which is defined by the rear end face of the second part 12 located in its initial axial position, the rear end portion of the guide passage 54 and the end portion of the air passage 62 downstream of the front valving end of the control valve 62. The pressure sensor 92 generates an output signal indicative of the detected air pressure in the rear space 93.

The stop member 94 is slidably received in a guide passage formed in the housing 42 such that the guide passage is perpendicular to the direction of extension of the guide passage 54.

The actuator 96 includes a plunger 102 which is axially slidably supported by a housing 100 fixed to the housing 42. The actuator 96 further includes a pair of solenoid coils 104a, 104b which are selectively energized to produce magnetic forces for advancing and retracting the plunger 102. Thus, the actuator 96 is an electromagnetically operated actuator. The stop member 94 is formed as an integral part of the plunger 102, such that the stop member 94 is coaxial with the plunger 102. When the solenoid coil 104a is energized, the stop member 94 is moved or advanced by the magnetic force produced by the solenoid coil 104a, to its stop position in which the stop member 94 mechanically engages the second part 12 located in its initial axial position, so as to inhibit the initiation of acceleration of the second part 12 by the pressure of the pressurized air applied thereto with the control valve 64 placed in its open position. Thus, the stop position of the stop member 94 is one example of an inhibiting position for inhibiting the initiation of the acceleration of the second part 12. When the solenoid coil 104b is energized, on the other hand, the stop member 94 is moved or retracted by the magnetic force produced by this solenoid coil 104b, from its stop position to its non-stop position in which the stop member 94 is spaced apart from the second part 12, so as to permit the initiation of the acceleration of the second part 12 by the pressure of the pressurized air with the control valve 62 placed in the open position. Thus, the non-stop position of the stop member 94 is one example of a permitting position for permitting the initiation of the acceleration of the second part 12.

While the two solenoid coils 104a, 104b are used to move the plunger 102 bidirectionally to move the stop member 94 between the stop and non-stop positions, only one solenoid coil 104 may be used to move the stop member 94 to one of the stop and non-stop positions. In this case, the stop member 94 is moved to the other position by a suitable elastic or biasing member such as a spring.

In the present embodiment, the stop member 94 has a part spherical shape at its free end and is adapted to engage a fillet formed on the second part 12 between the large-diameter rear axial end portion 22 and an axially intermediate portion between the two large-diameter end portions 20, 22, when the second part 12 is located at the predetermined initial axial position. However, the stop member 94 may be adapted to engage the end face of the second part 12 on the side of the large-diameter front axial end portion 20.

The acceleration initiation inhibiting and permitting device 90 further includes a controller 110, which is connected to the pressure sensor 92, the actuator 96, and the electric motor 80 of the drive device 66 of the thrust force applying device 58. The controller 110 is principally constituted by a computer incorporating a central processing unit (CPU), a read-only memory (ROM) and a random-access memory (RAM). The ROM stores a control program which is executed by the CPU for performing a routine illustrated in the flow chart of FIG. 2, while utilizing a temporary data storage function of the RAM, so as to move the stop member 94 to the stop position and the non-stop position, for controlling the timing of initiation of the acceleration of the second part 12 by the pressure of the pressurized air.

The housing 42 also has two air breathers 114, 116. The air breather 114 communicates at one end thereof with the guide passage 54, and at the other end with the atmosphere. The position of the communication of the air breather 114 with the guide passage 54 is determined so that the portion of the guide passage 54 partially defined by the rear end face of the second part 12 is brought into communication with the atmosphere through the air breather 114 when the second part 12 accelerated by the pressurized air has been moved to a position indicated in FIG. 1, at which the large-diameter rear end portion 22 has passed the open end of the air breather 114. That is, the air breather 114 is open to the guide passage 54 at such a position that permits the rear end portion 22 of the second part 12 to open the open end of the air breather 114, immediately before the second part 12 comes into abutting contact with the first part 10 in the air chamber 46. When the guide passage 54 is brought into communication with the atmosphere, that is, when the pressure in the guide passage 54 is lowered down to the atmospheric pressure immediately before the abutting contact of the second part 12 with the first part 10, an accelerating motion of the second part 12 changes into a uniform or constant-velocity motion.

On the other hand, the air breather 116 is formed in the housing 42 such that the air breather 116 communicates at one end thereof with the air chamber 46 and at the other end with the atmosphere, so as to prevent a rise of the pressure in the air chamber 46 due to the movement of the first part 12 into the air chamber 46, for thereby permitting the second part 12 to be moved toward the first part 10 through the air chamber 46, without being disturbed by the pressure rise in the air chamber 46.

Figure 2:
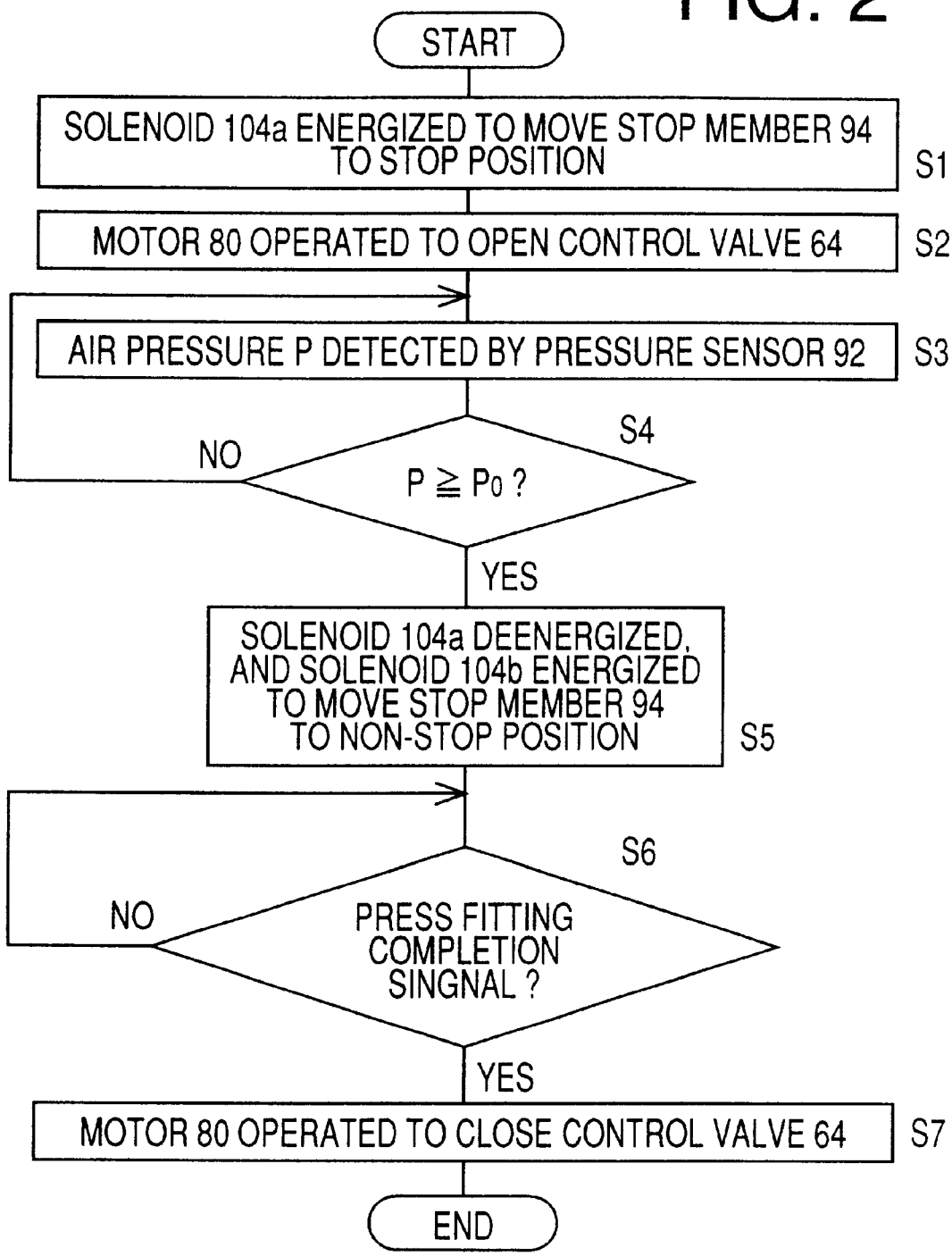
FIG. 2 is a flow chart according to a control program executed by a computer of a controller of the press fitting apparatus of FIG. 1.
Figure 3:
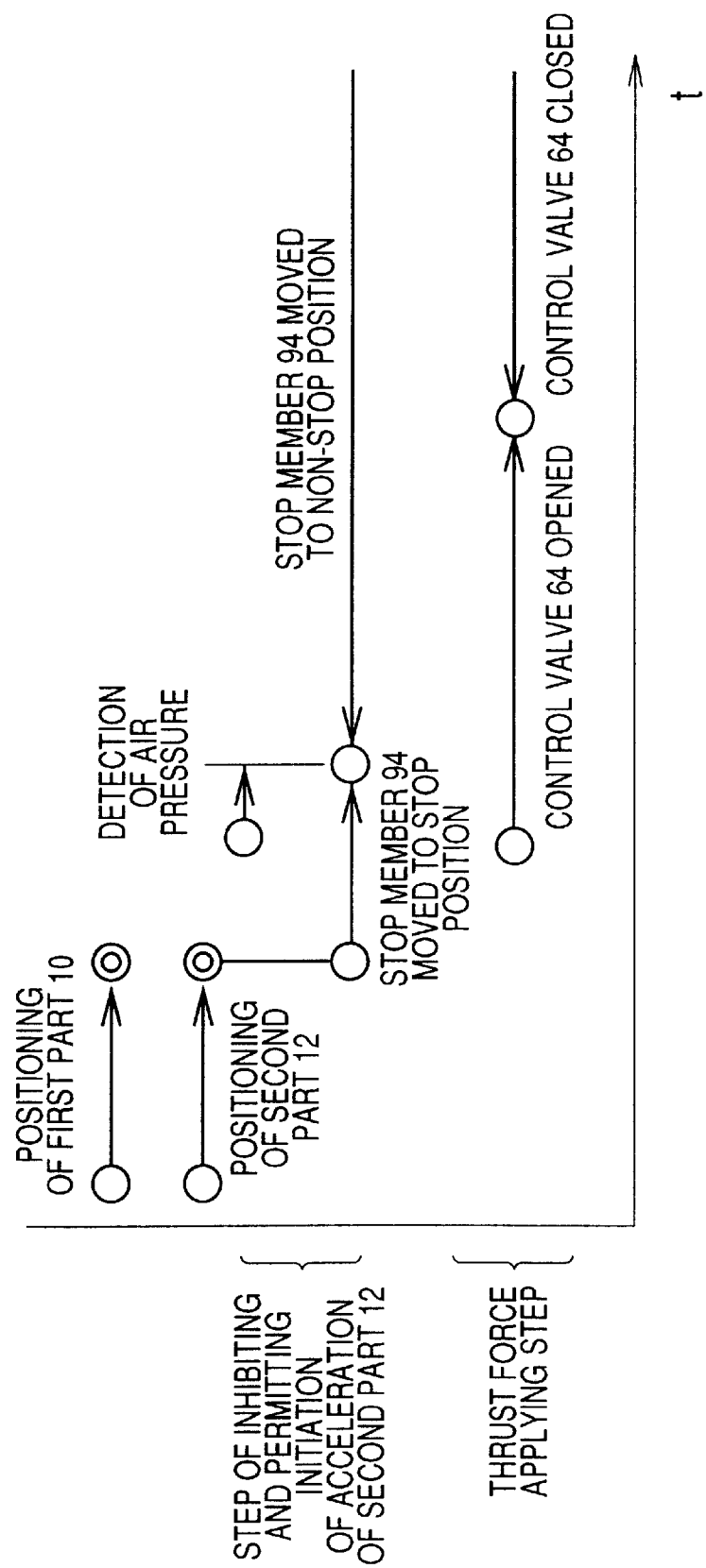
FIG. 3 is a view illustrating one cycle of operation performed by the press fitting apparatus of FIG. 1, with events of the operation indicated in relation to the time.

Referring next to the flow chart of FIG. 2 and the view of FIG. 3 illustrating events of operation in one cycle of the press fitting apparatus, there will be described a method of effecting an interference fit of the first and second parts 10, 12.

Initially, the operator sets the first and second parts 10, 12 at predetermined positions in the press fitting apparatus. The second part 12 is set at its predetermined initial axial position indicated by broken line in FIG. 1. Then, the operator turns on the controller 110, and manipulates a suitable switch for applying an OPERATION START signal to the controller 110. In response to this signal, the computer of the controller 110 initiates the routine of FIG. 2 according to the program stored in the ROM. Prior to the initiation of this routine, the pressurized air having the predetermined pressure is stored in the high-pressure air tank 60.

The routine of FIG. 2 is initiated with step S1 in which the solenoid coil 104a is energized while the solenoid coil 104b is de-energized, whereby the stop member 94 is moved to the stop position of FIG. 1. Step S1 is followed by step S2 in which the electric motor 80 is operated to operate the control valve 64 to open the air passage 62, whereby air pressure P in the rear space 93 begins to be raised. Then, the control flow goes to step S3 in which the air pressure P in the rear space 93 is detected by the pressure sensor 92. Step S3 is followed by step S4 to determine whether the detected air pressure P has been raised to a predetermined value $P_0$. If an affirmative decision (YES) is obtained in step S4, the control flow goes to step S5 in which the solenoid coil 104b is energized while the solenoid coil 104a is de-energized, to move the stop member 94 to the non-stop position. As a result, the acceleration of the second part 12 is initiated with a suitable thrust force corresponding to the predetermined air pressure value $P_0$, so that the second part 12 is given a kinetic energy. The second part 12 is moved through the guide passage 54 toward the first part 10 by the kinetic energy, and is then brought into abutting contact with the first part 10, whereby the interference fit of the first and second parts 10, 12 is eventually achieved.

Then, the control flow goes to step S6 to determine whether the controller 110 has received a PRESS FITTING COMPLETION signal which is generated by manipulation of a suitable switch by the operator. If an affirmative decision (YES) is obtained in step S6, the control flow goes to step S7 in which the motor 80 is operated to operate the control valve 64 to the closed position to close the air passage 62, for preparation of the next cycle of operation of the press fitting apparatus. Thus, one cycle of operation of the apparatus is completed.

In the present embodiment, the air pressure P corresponding to the actual thrust force to be applied to the second part 12 is detected and fed back to the controller 110 to control the value of the thrust force at which the acceleration of the second part 12 by the pressurized air is permitted and initiated. Accordingly, the thrust force by and at which the acceleration of the second part 12 is initiated is stabilized for improving the stability of accuracy of the interference fit of the two parts 10, 12, irrespective of a variation in the pressure of the pressurized air in the high-pressure air tank 60 and a variation in the pressure change characteristic of the tank 60 (which depends upon the volume of the tank 60, for instance).

Thus, the present embodiment is arranged to feedback control the actual thrust force to be applied to the second part 12 upon initiation of the acceleration thereof by the pressurized air. For example, the predetermined value $P_0$ may be set at an expected peak value of the air pressure P, where the air pressure in the tank 60 inevitably varies as a function of time. In this case, the second part can be accelerated by a sufficiently large thrust force based on the air pressure P, so that the distance of movement of the second part 12 by continuous application of the thrust force, namely, an accelerating distance of the second part 12 can be effectively minimized, making it possible to reduce the size of the press fitting apparatus.

It will be understood from the foregoing description of the present embodiment that a portion of the controller 110 assigned to implement steps S2, S6 and S7 corresponds to a step of applying a thrust force to the second part 12, while a portion of the controller 110 assigned to implement steps S3–S5 corresponds to a step of inhibiting and permitting the initiation of the acceleration of the second part 12 by the pressurized air. It will also be understood that the stop member 94 functions as a movable member which is movable to an inhibiting position in which it engages the second part 12 to inhibit the initiation of its acceleration, and a permitting position in which it is spaced apart from the second part 12 to permit the initiation of its acceleration. It will further be understood that the pressure sensor 92, actuator 96 and controller 110 cooperate to constitute a moving device for moving the movable member in the form of the stop member 94 to the stop and non-stop positions as the inhibiting and permitting positions, respectively.

Figure 4:
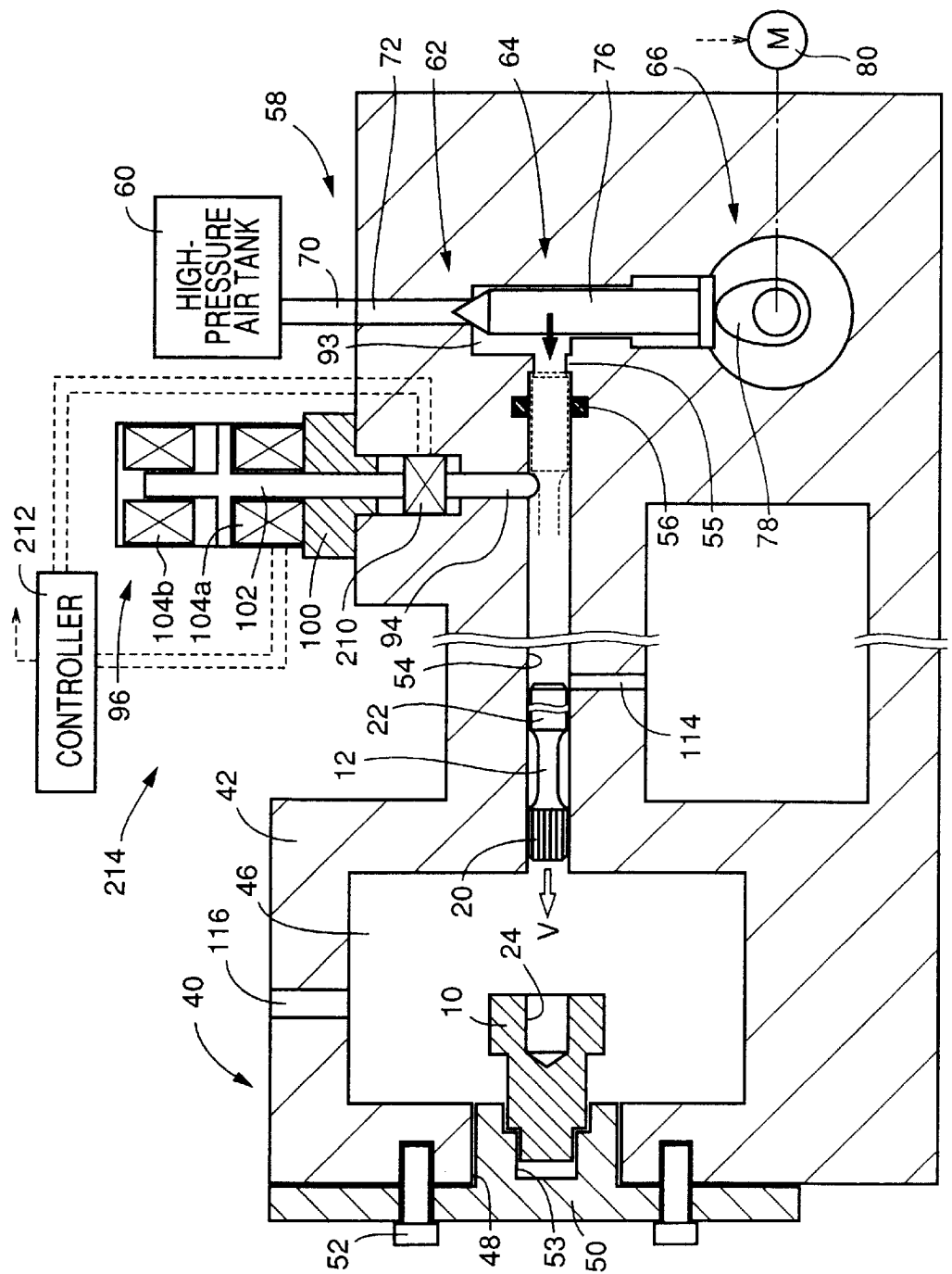
FIG. 4 is a side elevational view in cross section of a press fitting apparatus constructed according to another embodiment of this invention.
Figure 5:
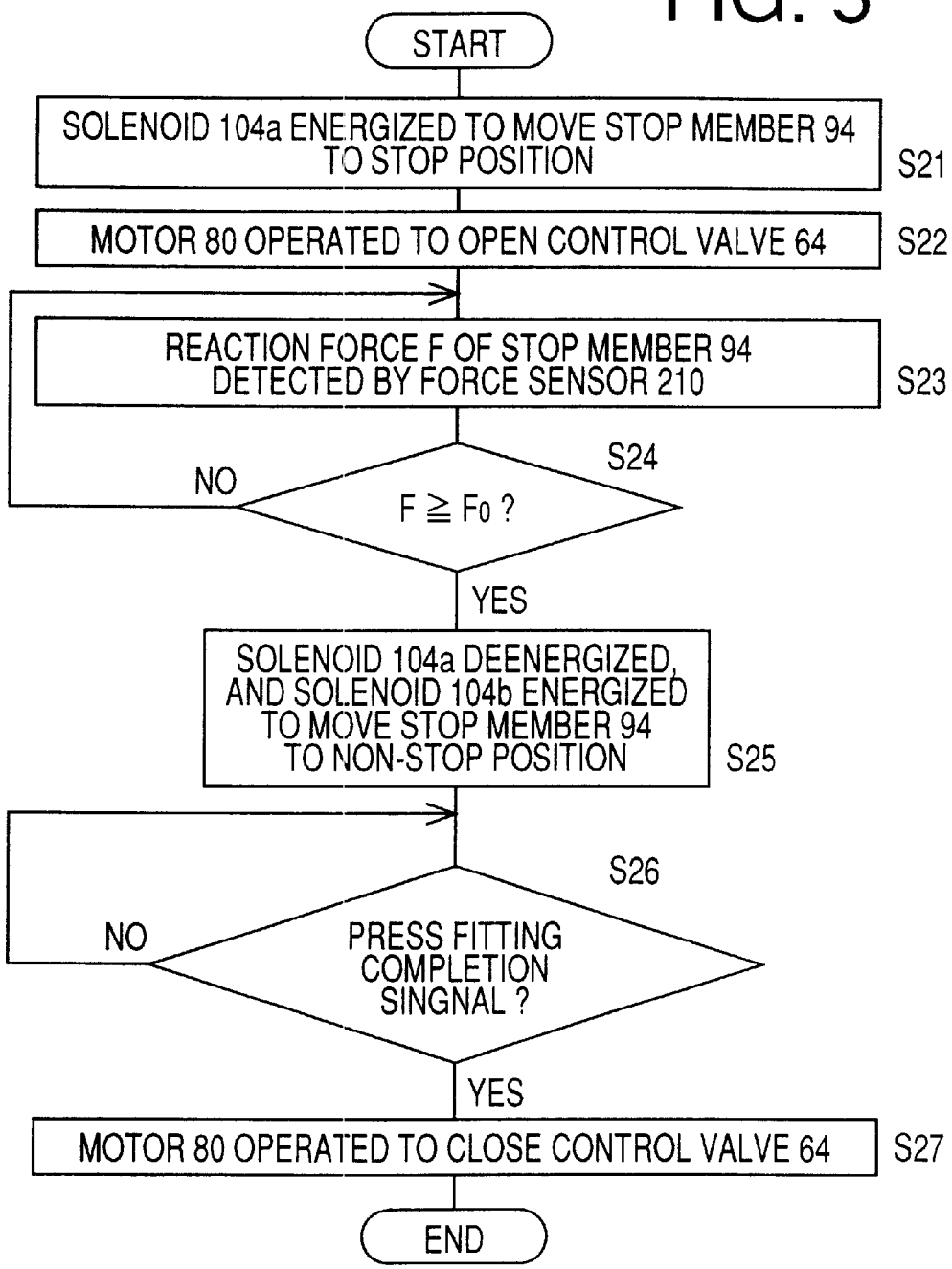
FIG. 5 is a flow chart according to a control program executed by a computer of a controller of the apparatus of FIG. 4.

Referring next to FIGS. 4 and 5, there will be described a second embodiment of this invention. The same reference signs as used in FIG. 1 will be used in FIG. 4 to identify the same elements, and redundant description of these elements will not be provided in the interest of simplification of the description.

In this second embodiment of FIG. 4, a force sensor 210 is used in place of the pressure sensor 92 used in the first embodiment of FIG. 1. This force sensor 210 is provided on the stop member 94, which mechanically engages the second part 12 in its initial axial position to inhibit the initiation of the acceleration. With the air pressure P in the rear space 93 acting on the second part 12, the thrust force corresponding to the air pressure P acts on the stop member 94 through the second part 12, whereby a reaction force (which resists a bending moment) is generated by the stop member 94. The force sensor 210 detects this reaction force, as a parameter or quantity relating to or representing the thrust force to be applied to the second part 12. The force sensor 210 may include a strain gage bonded to the surface of the stop member 94.

The force sensor 210 as well as the motor 80 and the actuator 96 is connected to a controller 212 which is principally constituted by a computer whose ROM stores a control program for executing a routine illustrated in the flow chart of FIG. 5.

The routine of FIG. 5 is initiated with step S21 in which the actuator 96 is controlled to move the stop member 94 to the stop position. Then, the control flow goes to step S22 in which the electric motor 80 is operated to operate the control valve 64 to the open position to open the air passage 62. As a result, the pressure in the rear space 93 begins to be raised. Then, the control flow goes to step S23 in which the reaction force F of the stop member 94 is detected by the force sensor 210. Step S23 is followed by step S24 to determine whether the detected reaction force F has reached a predetermined value $F_0$. If an affirmative decision (YES) is obtained in step S24, the control flow goes to step S25 in which the actuator 96 is controlled to move the stop member 94 to the non-stop position. As a result, the acceleration of the second part 12 by a suitable thrust force corresponding to the predetermined reaction force value $F_0$ is initiated. The second part 12 is moved through the guide passage 54 toward the first part 10 by a kinetic energy given by the acceleration, and is then brought into abutting contact with the first part 10, whereby the interference fit of the first and second parts 10, 12 is eventually achieved.

Then, the control flow goes to step S26 to determine whether the controller 212 has received the PRESSING FIT COMPLETION signal which is generated by manipulation of the appropriate switch by the operator. If an affirmative decision (YES) is obtained in step S26, the control flow goes to step S27 in which the motor 80 is operated to operate the control valve 64 to the closed position to close the air passage 62, for preparation of the next cycle of operation of the press fitting apparatus. Thus, one cycle of operation of the apparatus is completed.

It will be understood from the foregoing description of the second embodiment that a portion of the controller 212 assigned to implement steps S22, S26 and S27 corresponds to the thrust force applying step, while a portion of the controller 212 assigned to implement steps S21 and S23–S25 corresponds to the acceleration initiation inhibiting and permitting step. It will also be understood that the stop member 94 functions as the movable member movable between the inhibiting and permitting positions, and that the force sensor 210, actuator 96 and controller 212 cooperate with each other to constitute the moving device for moving the movable member 94 to the inhibiting and permitting positions. It will also be understood that the stop member 94, force sensor 210, actuator 96 and controller 212 cooperate to constitute an acceleration initiation inhibiting and permitting device 214 for inhibiting and permitting the initiation of the acceleration of the second part 12 by the pressurized air.

Figure 6:
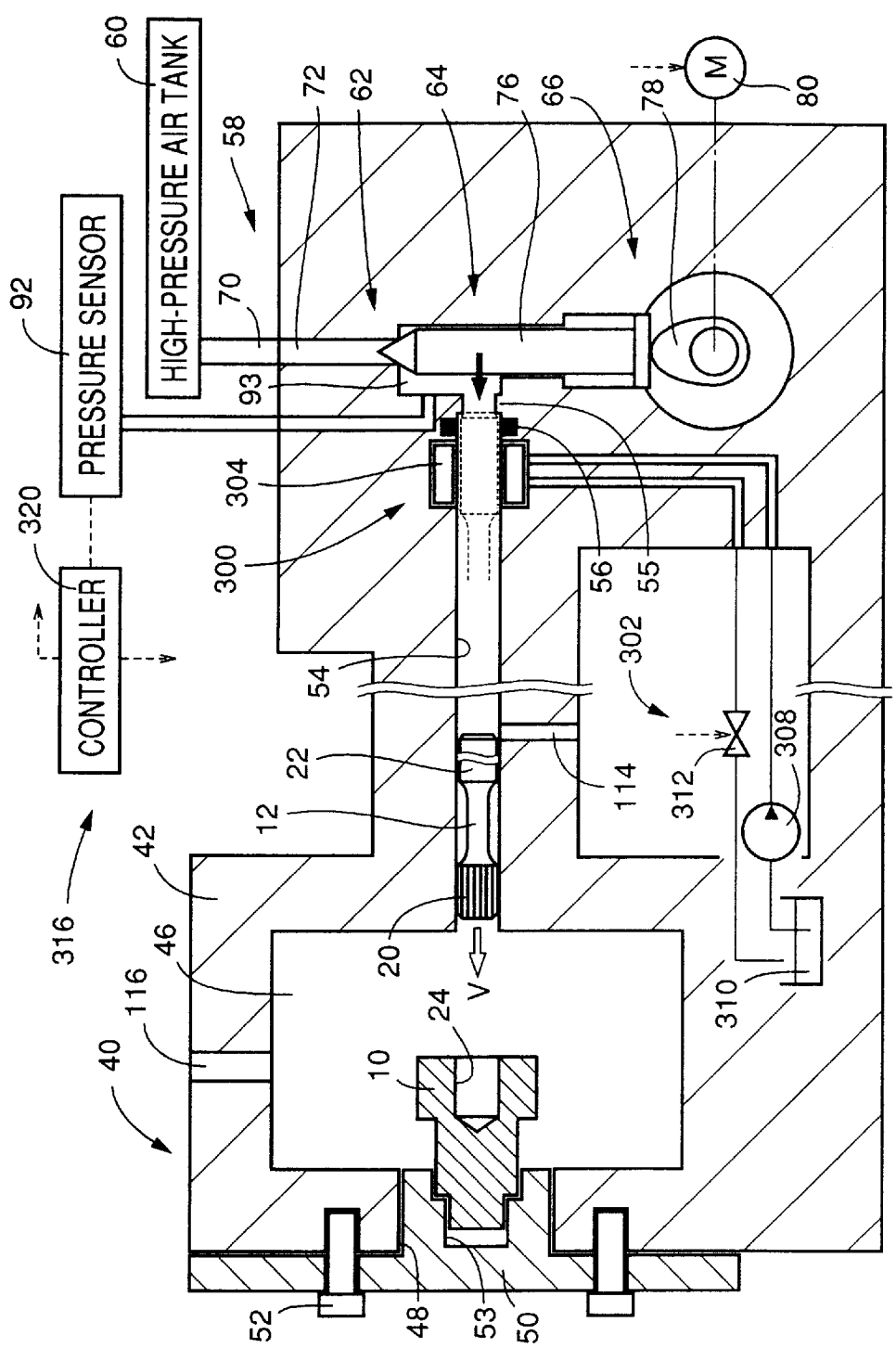
FIG. 6 is a side elevational view in cross section of a press fitting apparatus constructed according to a further embodiment of the invention.
Figure 7:
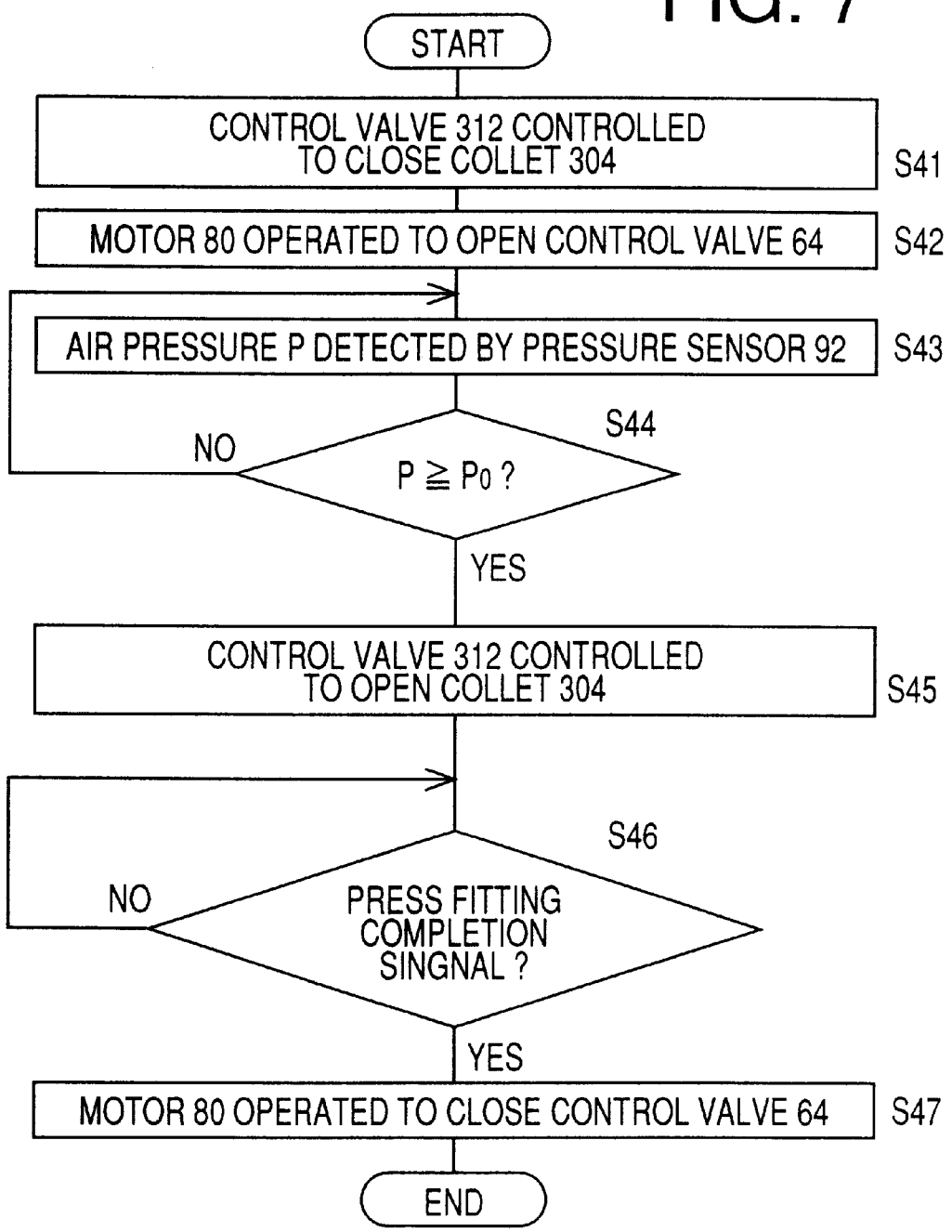
FIG. 7 is a flow chart according to a control program executed by a computer of a controller of the apparatus of FIG. 6.

Referring to FIGS. 6 and 7, there will be described a third embodiment of this invention in which the same reference signs as used in the first embodiment will be used to identify the same elements.

In the third embodiment of FIG. 6, a clamping mechanism in the form of a hydraulically operated collet chuck 300 is used in place of the stop member 94 used in the first and second embodiments of FIGS. 1 and 4, and a hydraulically operated actuator 302 is used in place of the electromagnetically operated actuator 96 used in the embodiments of FIGS. 1 and 4.

The collet chuck 300 is equipped with a movable member in the form of a collet 304 adapted to hold the second part 12 as the workpiece at its outside diameter. Described in detail, the collet chuck 300 is adapted to change the effective diameter of the collet 304, that is, to reduce the effective diameter of the collet 304 to clamp the second part 12, and increase the effective diameter to unclamp the second part 12.

The collet chuck 300 is constructed to reduce the effective diameter of the collet 304 by a hydraulic pressure, and to permit the effective diameter of the collet 304 by an elastic force thereof. To operate the collet 304 to clamp the second part 12, the collect chuck 300 is connected to the actuator 302, which includes (a) a high-pressure source in the form of a pump 308 for applying pressurized fluid having a high pressure to the collet 304 so as to reduce its effective diameter, (b) a reservoir 310 from which the fluid is sucked and pressurized by the pump 308, and (c) a control valve 312 for controlling flows of the fluid between the pump 308, reservoir 310 and collet 304. The control valve 312 is an electromagnetically operated valve having an unclamp position and a clamp position which are selectively established depending upon the magnetic force generated by energization of a solenoid coil. In the unclamp position, the pressurized fluid is allowed to be discharged from the collet 304 toward the reservoir 310 for thereby permitting the collet 304 to be expanded to the larger effective diameter by the biasing force of itself. In the clamp position, the discharge flow of the pressurized flow from the collet 304 toward the reservoir 310 is inhibited, to hold the smaller effective diameter of the collet 304.

The collet 304 has a plurality of sections which are arranged in the circumferential direction of the workpiece or the second part 12. An array of these sections of the collet 304 is considered to be a movable member having an inhibiting position for contact with the second part 12 to inhibit the initiation of the acceleration of the second part 12 by the pressurized air delivered from the high-pressure air tank 60, and a permitting position in which the sections are spaced apart from the outer circumferential surface of the second part 12, to permit the initiation of the acceleration of the second part 12.

The control valve 312 as well as the electric motor 80 and the pressure sensor 92 is connected to a controller 320, which is principally constituted by a computer whose ROM stores a control program for executing a routine illustrated in the flow chart of FIG. 7.

The routine of FIG. 7 is initiated with step S1 in which the control valve 312 is operated to the clamp position to close the collet 304, for holding the second part 12 to inhibit the initiation of the acceleration of the second part 12. That is, the discharge flow of the pressurized fluid from the collet 304 toward the reservoir 310 is inhibited by the control valve 312 placed in the clamp position. Then, the control flow goes to step S42 in which the motor 80 is operated to operate the control valve 64 to the open position for opening the air passage 62. As a result, the air pressure P in the rear space 93 begins to be raised. Step S42 is followed by step S43 in which the air pressure P in the rear space 93 is detected by the pressure sensor 92. Then, the control flow goes to step S44 to determine whether the detected air pressure P has reached the predetermined value $P_0$. If an affirmative decision (YES) is obtained in step S44, the control flow goes to step S45 in which the control valve 312 is operated to the unclamp position to open the collet 304, that is, to permit the flow of the pressurized fluid from the collet 304 toward the reservoir 310, whereby the second part 12 is unclamped, to permit the initiation of the acceleration of the second part 12 by the suitable thrust force corresponding to the predetermined air pressure value $P_0$. The second part 12 is moved through the guide passage 54 toward the first part 10 by a kinetic energy given by the acceleration, and is brought into abutting contact with the first part 10, whereby the interference fit of the two parts 10, 12 is eventually achieved.

Then, the control flow goes to step S46 to determine whether the controller 320 has received the PRESSING FIT COMPLETION signal which is generated by manipulation of the appropriate switch by the operator. If an affirmative decision (YES) is obtained in step S46, the control flow goes to step S47 in which the motor 80 is operated to operate the control valve 64 to the closed position for closing the air passage 62, for preparation for the next cycle of operation of the press fitting apparatus. Thus, one cycle of operation of the apparatus is completed.

It will be understood from the foregoing description of the third embodiment of the invention that a portion of the controller 320 assigned to implement steps S42, S46 and S47 corresponds to the thrust force applying step, while a portion of the controller 320 assigned to implement steps S41 and S43–S45 corresponds to the acceleration initiation inhibiting and permitting step. It will also be understood that the collet 304 of the collet chuck 300 functions as the movable member movable to the inhibiting and permitting positions, and that the pressure sensor 92, actuator 302 and controller 320 cooperate to constitute the moving device for moving the movable member 304 to the inhibiting and permitting positions. It will also be understood that the collet chuck 300, pressure sensor 92, actuator 302 and controller 320 cooperate to constitute an acceleration inhibiting and permitting device 316 for inhibiting and permitting the initiation of the acceleration of the second part 12 by the pressurized air.

Figure 8:
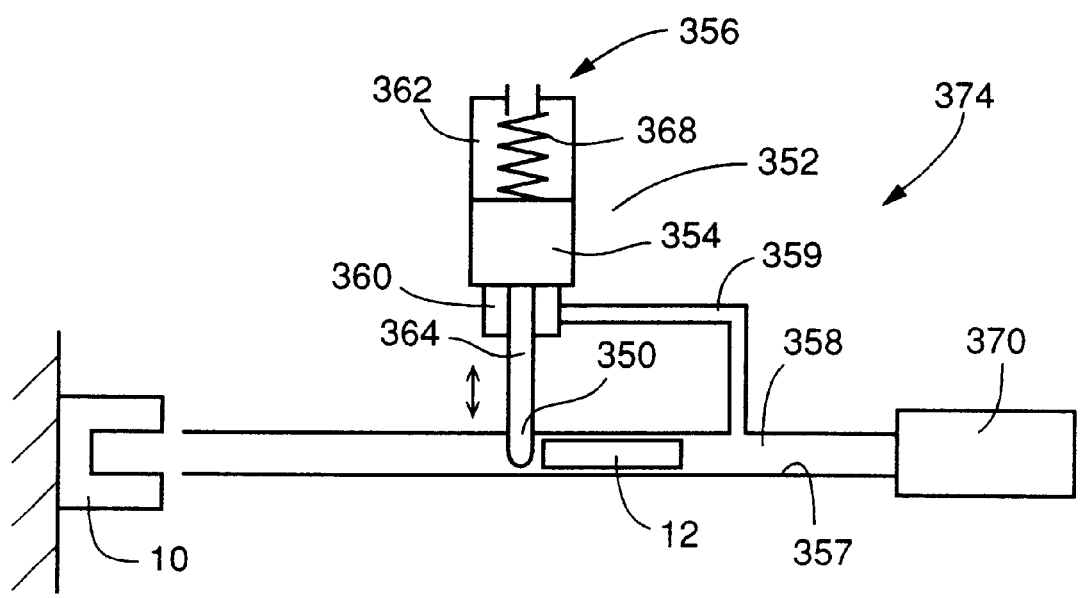
FIG. 8 is a side elevational view schematically illustrating a press fitting apparatus according to a yet further embodiment of the invention.

A fourth embodiment of the present invention will be described by reference to FIG. 8. In the first, second and third embodiments, the acceleration initiation inhibiting and permitting device 90, 214, 316 are controlled by the controller 110, 212, 320 on the basis of the output signal of the pressure sensor 92 or force sensor 210. In the present fourth embodiment of FIG. 8, however, the movement of a stop member 350 as the movable member is not controlled by a controller, but is automatically controlled in a self-feedback fashion on the basis of the air pressure at the rear of the second part 12.

Described more specifically, the press fitting apparatus has a housing 352, and an actuator 356 including a piston 354 which is substantially gas-tightly (pressure-tightly) and slidably received in the housing 352. The piston 354 partially define an air chamber 360 and an atmospheric pressure chamber 362 open to the atmosphere. The air chamber 360 communicates through an air passage 359 with a rear space 358 which is defined by a rear end portion of a guide passage 357 for slidably guiding the second part 12 toward the first part 10, and the rear end face of the second part 12 placed in a predetermined initial axial position thereof. A rod 364 extends from one of its opposite surfaces of the piston 354 on the side of the air chamber 360, coaxially with the piston 354. The stop member 350 indicated above is formed as an integral part of the rod 364 such that the stop member 350 is coaxial with the piston 354. A spring 368 is accommodated in the atmospheric pressure chamber 362, for biasing the piston 354 toward its fully advanced position of FIG. 8, in which the stop member 350 mechanically engages the second part 12 placed in its initial axial position of FIG. 8, to thereby inhibit the initiation of the acceleration of the second part 12 by pressurized air delivered from a high-pressure source 370 into the rear space 358. When the pressure in the pressurized air in the rear space 358 has exceeded a predetermined threshold corresponding to a biasing force of the spring 368, the piston 354 is moved from the fully advanced position to its fully retracted position by the pressure in the air chamber 360, whereby the stop member 350 is moved apart from the second part 12, thereby permitting the initiation of the acceleration of the second part 12 by the pressurized air in the rear space 358.

It will be understood that the actuator 356 utilizes the air pressure in the rear space 358, as a pilot pressure for determining the time at which the piston 354 is moved from the fully advanced position toward its fully retracted position. It will also be understood that the actuator 356 and the air passage 359 cooperate to constitute a moving device for moving the movable member in the form of the stop member 350 between the inhibiting a permitting positions for inhibiting and permitting the initiation of the acceleration of the second part 12 by the pressurized air. It will also be understood that the stop member 350, actuator 356 and air passage 359 cooperate to constitute an acceleration inhibition inhibiting and permitting device 374 for inhibiting and permitting the initiation of the acceleration of the second part 12 by the pressurized air.

Figure 9:
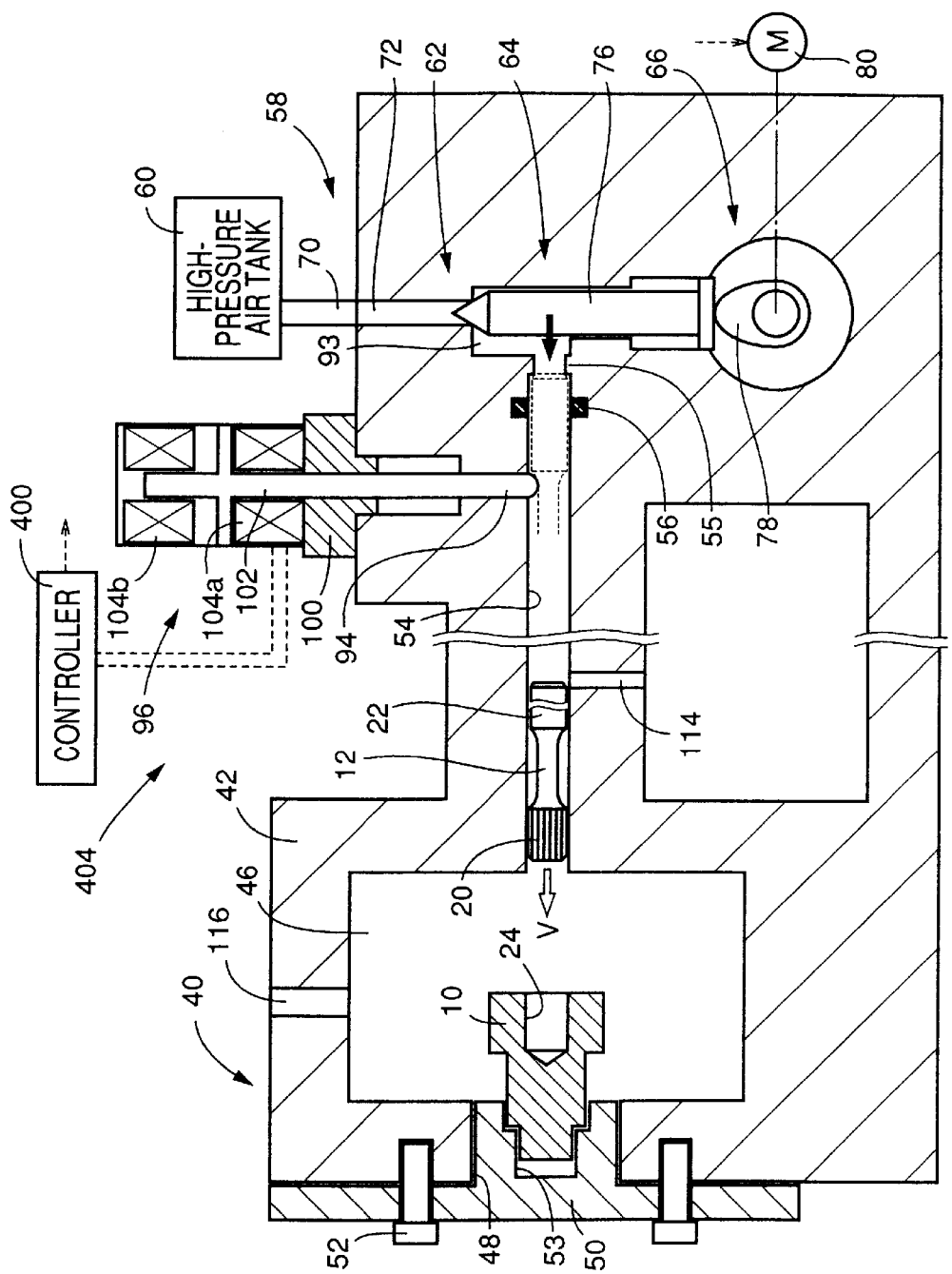
FIG. 9 is a side elevational view in cross section of a press fitting apparatus according to a still further embodiment of the invention.
Figure 10:
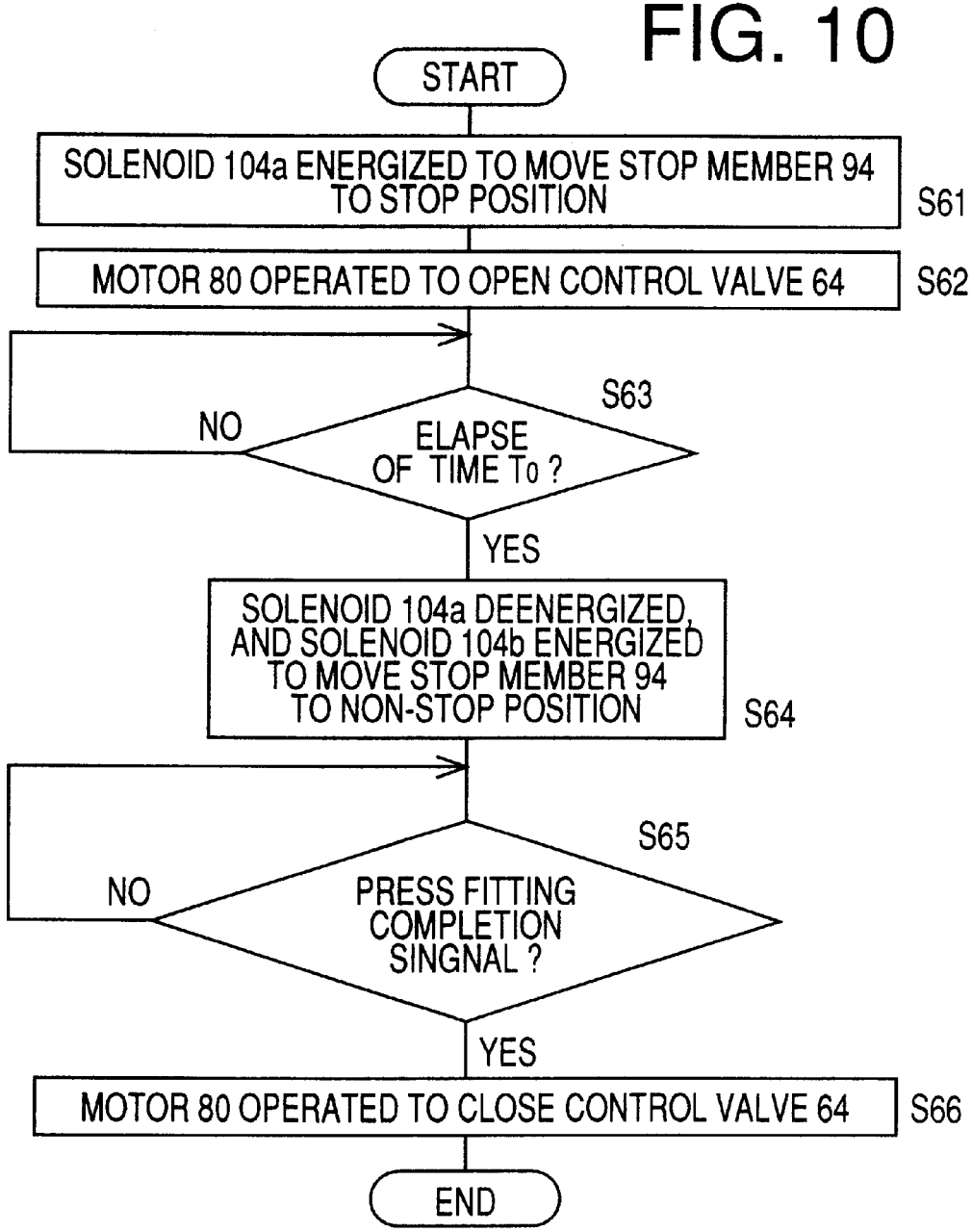
FIG. 10 is a flow chart according to a control program executed by a computer of a controller of the apparatus of FIG. 9.

Referring to FIGS. 9 and 10, there will be described a fifth embodiment of this invention. The same reference signs as used in the first embodiment will be used in FIG. 9 to identify the same elements.

In the embodiment of FIG. 9, the pressure sensor 92 or force sensor 210 is not used to detect a quantity relating to the thrust force to be applied to the second part 12, and the movement of the stop member 94 is not controlled on the basis of the detected thrust force, but is controlled on the basis of a time which has passed after the air passage 62 is opened by the control valve 64. The present embodiment is based on a fact that when a predetermined time has passed after the air passage 62 is opened, the air pressure P is expected to have been raised to a predetermined value $P_0$. In the present embodiment, the electric motor 80 and the solenoid coils 104a, 104b of the actuator 96 are connected to a controller 400, which is principally constituted by a computer whose ROM stores a control program for executing a routine illustrated in the flow chart of FIG. 10.

The routine of FIG. 10 is initiated with step S61 in which the actuator 96 is controlled to move the stop member 94 to the stop position. Then, the control flow goes to step S62 in which the motor 80 is operated to operate the control valve 62 to the open position to open the air passage 62. As a result, the air pressure in the rear space 93 begins to be raised. Step S62 is followed by step S63 to determine whether a time T which has passed after the control valve 64 is operated to open the air passage 62 has reached a predetermined time $T_0$, which is determined by experiment such that the air pressure P in the rear space 93 is stabilized at a level substantially equal to the level in the high-pressure air tank 60 when the predetermined time $T_0$ has passed after the control valve 64 is operated to the open position to open the air passage 62. If an affirmative decision (YES) is obtained in step S63, the control flow goes to step S64 in which the actuator 96 is controlled to move the stop member 94 to the non-stop position, for permitting the initiation of the acceleration of the second part 12 by the suitable thrust force corresponding to the predetermined air pressure value $P_0$, so that the second part 12 is given a kinetic energy. The second part 12 is moved through the guide passage 54 toward the first part 10 by the kinetic energy, and is brought into abutting contact with the first part 10, whereby the interference fit of the two parts 10, 12 is eventually achieved.

Then, the control flow goes to step S65 to determine whether the controller 400 has received the PRESS FITTING COMPLETION signal generated by manipulation of the appropriate switch by the operator. If an affirmative decision (YES) is obtained in step S65, the control flow goes to step S66 in which the motor 80 is operated to operate the control valve 64 to the closed position to close the air passage 62, for preparation for the next cycle of operation of the press fitting apparatus. Thus, one cycle of operation of the apparatus is completed.

It will be understood from the foregoing description of the fifth embodiment of this invention that a portion of the controller 400 assigned to implement steps S62, S65 and S66 corresponds to the thrust force applying step, while a portion of the controller 400 assigned to implement steps s61, S63 and S64 corresponds to the acceleration initiation inhibiting and permitting step. It will also be understood that the stop member 94 functions as the movable member, and that the actuator 96 cooperates with the controller 400 to constitute the moving device for moving the movable member 94 to the inhibiting and permitting positions. It will also be understood that the stop member 94, actuator 96 and controller 400 cooperate to constitute an acceleration initiation inhibiting and permitting device 404 for inhibiting and permitting the initiation of the acceleration of the second part 12 by the pressurized air.

In the present fifth embodiment of FIGS. 9 and 10, the thrust force to be applied to the second part 12 upon initiation of the acceleration thereof can be controlled without using a sensor for detecting a quantity or parameter relating to or representing the thrust force. Accordingly, the thrust force can be stabilized without an increase in the cost of manufacture of the press fitting apparatus. However, the present embodiment should be adapted to implement to step S63 which requires a relatively long time, since the predetermined time $T_0$ which has passed after the moment of opening of the air passage 62 by the control valve 62 must be long enough to permit the air pressure P in the rear space 93 to be raised to a level substantially equal to the level within the high-pressure air tank 60, regardless of a possible variation in the pressure change characteristic within the air tank 60. In the first through fourth embodiments, on the other hand, it does not take such a long time before the moment of determination to permit the initiation of the acceleration of the second part 12 on the basis of the detected pressure P in the rear space 93 or the reaction force F of the stop member 94, or on the basis of the air pressure in the rear space 358 as the pilot pressure to be applied to the air chamber 360 of the actuator 456. That is, the time required to initiate the acceleration of the second part 12 and complete the interference fit of the two parts 10, 12 is relatively short, improving the press fitting efficiency in the first through fourth embodiments, than in the fifth embodiment.

Figure 11:
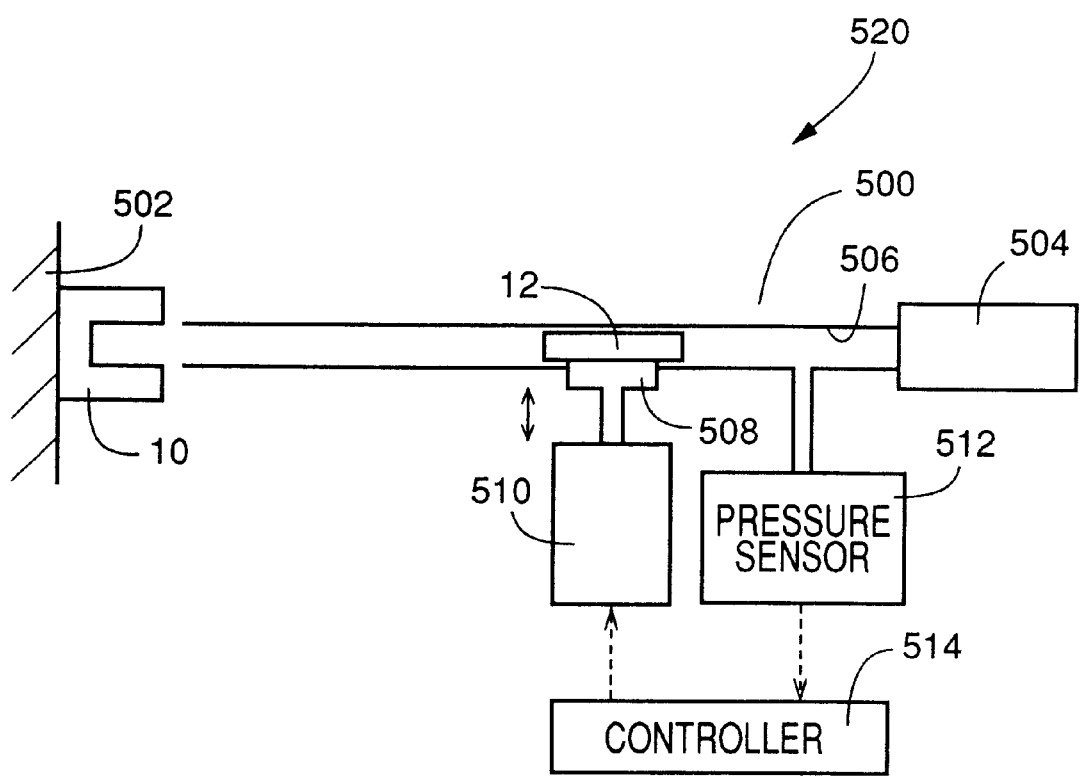
FIG. 11 is a view schematically illustrating a press fitting apparatus according to still another embodiment of this invention.
Figure 12:
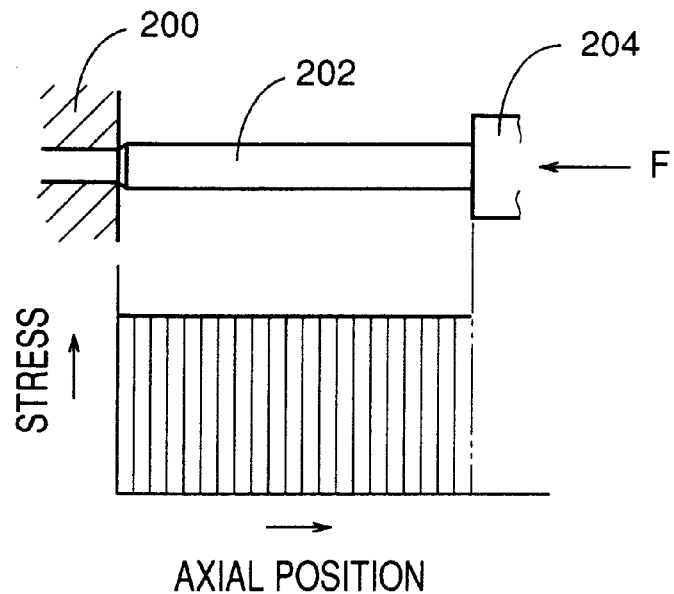
FIG. 12 is a view for explaining a principle of operation according to a conventional interference fit technique, and a problem in this technique.
Figure 13:
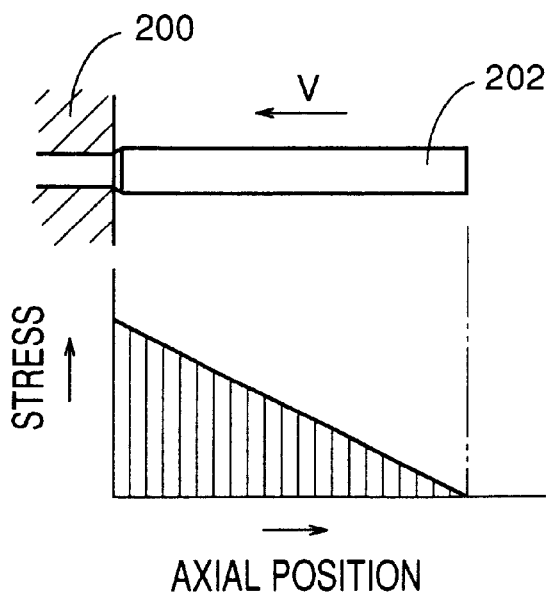
FIG. 13 is a view for explaining a principle of operation according to an interference fit technique developed by the assignee of the present application, and an advantage of this technique.

Referring next to FIG. 11, a sixth embodiment of the invention will be described. The same reference signs as used in the first embodiment will be used in FIG. 11 to identify the same elements.

In the present embodiment of FIG. 11, the press fitting apparatus has a housing 500, a holder device 502 for holding the first part 10, and a high-pressure source 504 storing a pressurized gas. The housing 500 has a guide passage 506 for slidably guiding the second part 12 toward the first part 10 which is held stationary by the holder device 502. A movable member in the form of a presser member 508 is disposed adjacent to the second part 12 placed in its predetermined initial axial position of FIG. 11. The presser member 508 is movable between (a) an advanced position in which the presser member 508 is held in pressing contact with one portion of the circumferential surface of the second part 12 for forcing the second part 12, for pressing contact of another portion of the circumferential surface diametrically opposite to the above-indicated one portion, with the inner surface of the guide passage 506, to thereby inhibit the initiation of the acceleration of the second part 12 by the pressurized gas delivered from the high-pressure source 504, and (b) a retracted position in which the presser member 508 is spaced apart from the second part 12, to permit the initiation of the acceleration of the second part 12. The movement of the presser member 508 is effected by an actuator 510 controlled by a controller 514 to which is connected a pressure sensor 512 for detecting the pressure P in a rear space which is partially defined by the rear end face of the second part 12. The controller 514 is principally constituted by a computer, which is adapted to execute a routine similar to that of FIG. 2 to control the actuator 510 on the basis of the thrust force estimated by the pressure P detected by the pressure sensor 512.

In the present sixth embodiment of FIG. 11, the presser member 508 functioning as the movable member is adapted to force the second part 12 onto the inner surface of the guide passage 506 to thereby increase a force of friction between the second part 12 and the presser member 508 and the surface of the guide passage 506. It will be understood that the pressure sensor 512, actuator 510 and controller 514 cooperate to constitute the moving device for moving the movable member 508 between the inhibiting and permitting positions, and that the presser member 508, pressure sensor 512, actuator 510 and controller 514 cooperate to constitute an acceleration initiation inhibiting and permitting device 520 for inhibiting and permitting the initiation of the acceleration of the second part 12 by the pressurized gas delivered from the high-pressure source 504.

While the several presently preferred embodiments of this invention have been described above in detail by reference to the accompanying drawings, for illustrative purpose only, it is to be understood that the present invention may be embodied with various changes, modifications and improvements, which may appear to those skilled in the art, without departing from the spirit and scope of the invention defined in the following claims.

What is claimed is:

1. A method of effecting an interference fit of a first part and a second part, comprising:

a thrust force applying step of applying a thrust force to said second part in a direction toward said first part to thereby accelerate said second part for applying a kinetic energy to said second part to cause abutting contact of said second part with said first part for achieving said interference fit of said first and second parts; and an acceleration initiation inhibiting and permitting step of inhibiting initiation of acceleration of said second part by said thrust force until said thrust force has been increased to a predetermined threshold, and permitting said initiation of said acceleration when said thrust force has been increased to said predetermined threshold.

2. A method according to claim 1, wherein said acceleration initiation inhibiting and permitting step comprises inhibiting said initiation of said acceleration of said second part by engagement of a stop member with said second part.

3. A method according to claim 1, wherein said acceleration initiation inhibiting and permitting step comprises inhibiting said initiation of said acceleration of said second part by clamping said second part.

4. A method according to claim 1, wherein said acceleration initiation inhibiting and permitting step comprises inhibiting said initiation of said acceleration of said second part by forcing said second part onto a stationary member to thereby generate a force of friction between said second part and said stationary member.

5. An apparatus for effecting an interference fit of a first part and a second part, comprising:

a thrust force applying device for applying a thrust force to said second part in a direction toward said first part to thereby accelerate said second part for applying a kinetic energy to said second part to cause abutting contact of said second part with said first part for achieving said interference fit of said first and second parts; and an acceleration initiation inhibiting and permitting device for inhibiting initiation of acceleration of said second part by said thrust force until said thrust force has been increased to a predetermined threshold, and permitting said initiation of said acceleration when said thrust force has been increased to said predetermined threshold.

6. An apparatus according to claim 5, wherein said acceleration initiation inhibiting and permitting device comprises a movable member movable to an inhibiting position in which said movable member engages said second part to inhibit said initiation of said acceleration of said second part, and a permitting position in which said movable member is spaced apart from said second part to permit said initiation of said acceleration of said second part.

7. An apparatus according to claim 6, wherein said movable member includes a stop member movable to a stop position as said inhibiting position in which said stop member engages a surface of said second part which faces said first part, to thereby inhibit said initiation of said acceleration of said second part, and a non-stop position as said permitting position in which said stop member is spaced apart from said surface of said second part, to thereby permit said initiation of said initiation of said second part, and wherein said acceleration initiation inhibiting and permitting device further comprises an actuator for moving said stop member to said stop position and said non-stop position.

8. An apparatus according to claim 6, wherein said movable member comprises a clamping member operable to a clamp position in which said clamping member is held in pressing contact with a surface of said second part for holding said second part in a direction intersecting said surface, and an unclamp position in which said clamping member is spaced apart from said surface, and said acceleration initiation inhibiting and permitting device further comprises an actuator for operating said clamping member to said clamp and unclamp positions.

9. An apparatus according to claim 6, further comprising a stationary housing having a guide passage for slidably guiding said second part, and wherein said movable member comprises a presser member movable to an advanced position in which said presser member forces said second part at a surface thereof facing an inner surface of said guide passage, onto said inner surface, to thereby inhibit said initiation of said acceleration of said second part, and a retracted position in which said presser member is spaced apart from said surface of said second part, to thereby permit said initiation of said acceleration of said second part, said acceleration initiation inhibiting and permitting device further comprises an actuator for moving said presser member to said advanced and retracted positions.

10. An apparatus for effecting an interference fit of a first part and a second part, comprising:

a thrust force applying device for applying a thrust force to said second part in a direction toward said first part to thereby accelerate said second part for applying a kinetic energy to said second part to cause abutting contact of said second part with said first part for achieving said interference fit of said first and second parts; and an acceleration initiation inhibiting and permitting device for inhibiting initiation of acceleration of said second part by said thrust force until said thrust force has been increased to a predetermined threshold, and permitting said initiation of said acceleration when said thrust force has been increased to said predetermined threshold, wherein said acceleration initiation inhibiting and permitting device comprises (a) a movable member movable to an inhibiting position in which said movable member engages said second part to inhibit said initiation of said acceleration of said second part, and a permitting position in which said movable member is spaced apart from said second part to permit said initiation of said acceleration of said second part, and (b) a moving device for moving said movable member to said inhibiting position until said thrust force has been increased to said predetermined threshold, and to said permitting position when said thrust force has been increased to said predetermined threshold.

11. An apparatus according to claim 10, wherein said moving device comprises:
   a sensor generating an output signal indicative of a quantity relating to said thrust force applied to said second part,
   an actuator for moving said movable member to said inhibiting and permitting positions; and
   a controller connected to said sensor and said actuator, for controlling said actuator on the basis of said output signal of said sensor, to hold said movable member in said inhibiting position until said thrust force has been increased to said predetermined threshold, and move said movable member to said permitting position when said thrust force has been increased to said predetermined threshold.

12. An apparatus according to claim 11, wherein said thrust force applying device includes a pressurizing device for raising a pressure acting on said second part in said direction toward said first part, to a level higher than an atmospheric pressure, for thereby applying said thrust force to said second part, and said sensor comprises a pressure sensor whose output signal said indicates said pressure acting on said second part, as said quantity, said controller controlling said actuator on the basis of said output signal of said pressure sensor.

13. An apparatus according to claim 12, wherein said pressurizing device comprises:
   a high-pressure source for delivering a pressurized gas;
   a structure for defining a guide passage for substantially gas-tightly and slidably guiding said second part toward said first part; and
   means for defining a gas passage connecting said high-pressure source and one of opposite end portions of said guide passage which is remote from said first part.

14. An apparatus according to claim 13, further comprising a sealing member held in gas-tight contact with an outer surface of said second part and an inner surface of said guide passage.

15. An apparatus according to claim 11, wherein said thrust force applying device comprises a pressurizing device for raising a pressure acting on said second part in said direction toward said first part, to a level higher than an atmospheric pressure, for thereby applying said thrust force to said second part, and said moving device comprises an actuator which receives as a pilot pressure said pressure acting on said second part and which is operated to hold said movable member in said inhibiting position until said pilot pressure has been raised to a predetermined level and to move said movable member to said permitting position when said pilot pressure has been raised to said predetermined level.

* * * * *

UNITED STATES PATENT AND TRADEMARK OFFICE
CERTIFICATE OF CORRECTION

PATENT NO.    : 6,560,846 B1
DATED         : May 13, 2003
INVENTOR(S)   : Shigemi Shioya et al.

It is certified that error appears in the above-identified patent and that said Letters Patent is hereby corrected as shown below:

Column 18,
Line 12, "initiation" (second occurrence) should read -- acceleration --.

Column 19,
Line 23, "signal said indicates" should read -- signal indicates --.

Signed and Sealed this

Thirtieth Day of September, 2003

JAMES E. ROGAN
*Director of the United States Patent and Trademark Office*